Nov. 17, 1925.
T. GANNESTAD
HYDRANT
Filed March 8, 1924
1,562,223
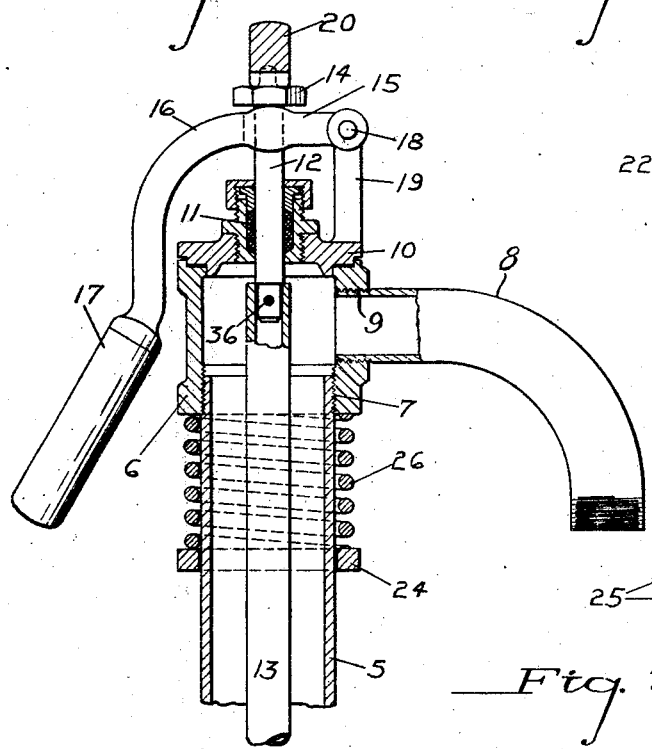
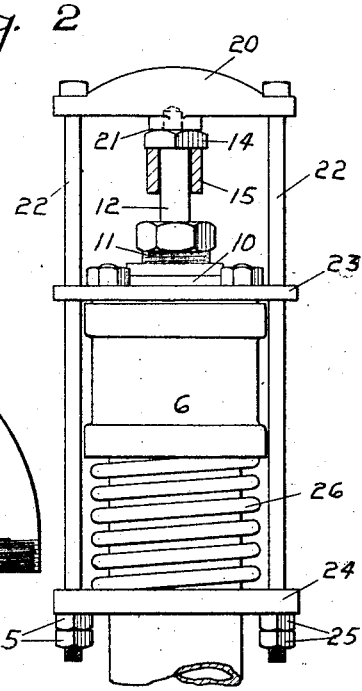
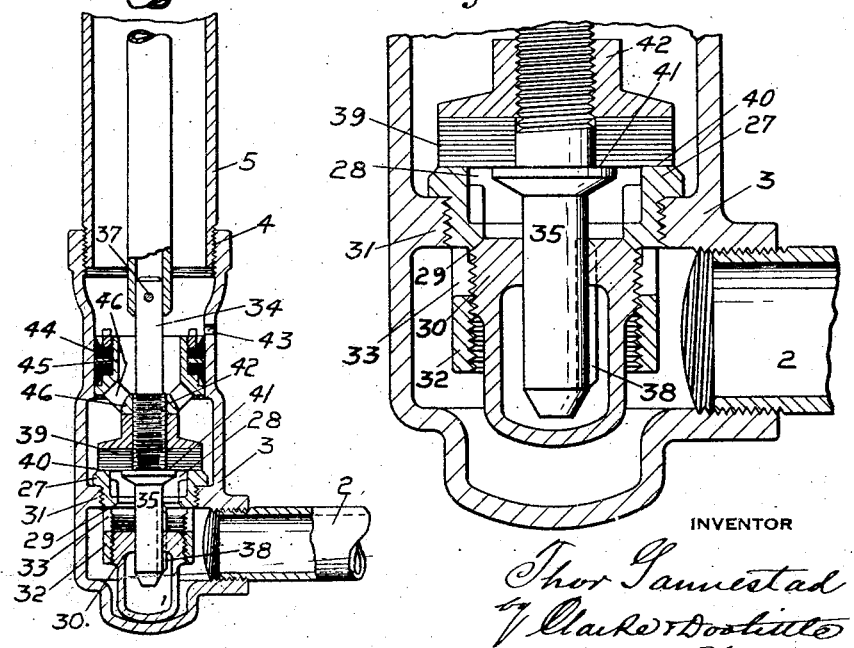
INVENTOR
Thor Gannestad
by Clarke & Doolittle
Attorneys Patented Nov. 17, 1925.

1,562,223

UNITED STATES PATENT OFFICE.

THOR GANNESTAD, OF PITTSBURGH, PENNSYLVANIA, ASSIGNOR TO EDGAR M. MOORE, OF PITTSBURGH, PENNSYLVANIA.

HYDRANT.

Application filed March 8, 1924. Serial No. 697,746.

*To all whom it may concern:*

Be it known that I, THOR GANNESTAD, a subject of the King of Norway, residing at Pittsburgh, in the county of Allegheny and State of Pennsylvania, have invented certain new and useful Improvements in Hydrants, of which the following is a specification.

My invention relates to the class of hydrants for supplying water or other liquid from an underground main. It has for its object to provide a simple, cheap, and efficient device for such purpose.

The hydrant, as a whole, comprises a stand pipe provided at its upper end with a delivery outlet, an operating handle, and centrally arranged operating rod, with an attached controlling valve arranged to open and close circulation from a supply main upwardly through the stand pipe and out of the upper delivery pipe, capable of automatic reseating when released.

The present improvement refers particularly to the construction of the circulation controlling valve, providing for closure of the flow and removal of the valve member, together with means for effecting re-seating action upon release of the controlling lever and other features of construction and advantage, as hereinafter described.

The invention is generally similar to that shown in prior patent of Moore #1,265,479, of May 7, 1918.

Referring to the drawings, showing one preferred embodiment of the invention:

Fig. 1 is a vertical section through the complete hydrant, partly broken away;

Fig. 2 is a view of the upper portion of the hydrant in elevation;

Fig. 3 is a sectional view showing the valve mechanism with the valve seated.

In the drawings, 2 is the main supply pipe or a branch pipe connected therewith, screwed into the lower base portion of the valve casing 3, connected by a screw joint at 4 with the main stand pipe 5 of any desired length. At its upper end, stand pipe 5 is screwed into the base of a head 6, by threaded connection at 7.

Head 6 is provided with a lateral supply pipe 8 similarly connected with the interior of the head by threaded connection 9. The upper portion of head 6 is closed by a cap 10 having a stuffing box 11, through which extends the stem 12 for actuating the main stem 13 for raising and lowering the lower valve. Stem 12 extends upwardly through stuffing box 11, and is provided with a terminal integral nut abutment 14 for lifting engagement by the bifurcated side members 15 of the handle lever 16. The latter is directed downwardly and outwardly, as shown, having the terminal handle 17, and its other end is pivotally connected at 18 with the terminal of bearing post 19 of cap 10.

For the purpose of automatically retracting the stem, upon release of the lifting lever, I provide a cross head 20, engaging the upper reduced terminal of stem 12 for centering and socketed engagement therewith, as indicated at 21, the outer ends of the cross head being connected with retracting rods 22—22. The latter extend downwardly through guiding extensions 23 of cap 10 and through the terminals of a ring 24 which slidably embraces the stand pipe 5. Rods 22 have terminal nuts 25 by which the tension of an interposed spring 26 may be regulated, such spring encircling the stand pipe between the ring and the lower shouldered terminal of head 6, as shown. By lifting rod 12 and the valve in casing 3, the circulation will be opened and maintained as long as the lever is held up, and upon release of the lever, the valve will be immediately closed by action of spring 26.

Within valve casing 3 at the lower end of the stand pipe is mounted an annular valve seated bushing 27 screwed into the middle portion of the valve casing, as shown, and provided with a central circulating space 28 having a lower annular valve seat 29, against which seats the vertically adjustable valve 30. The lower portion of bushing 27 extends downwardly below the cross bearing 31 in which it is threaded, and is provided with an interiorly threaded extension 32 having a series of laterally arranged circulation openings 33.

In the open position of Fig. 1, valve 30 is lowered below seat 29 for normal circulation from the supply pipe 2, while in Fig. 3, said valve is raised to seated position, cutting off the supply upwardly through the hydrant. Such adjustment of valve 30 is effected by rotation of the main stem 12 by its terminal nut 14 and the main connecting section 34 and the valve stem 35. These several sections are removably connected with each other by the telescoping joint and cross pin, as indicated at 36—37, providing for separation and removal, also for vertical thrust and rotation when such rotation is desired for effecting the movement of valve 30 on its threads. For such purpose, the lower stem 35 extends through the middle of valve 30 and has a sliding key connection therewith, as indicated at 38.

When stem 35 is rotated in one direction or another, it will seat or unseat the valve, as shown in the drawings, leaving the stem free to move vertically in the normal opening or closing of the main hydrant valve after ordinary use. Such main valve 39 consists of a circular head or disk of suitable material or composition, as vulcanized rubber, adapted to seat downwardly on the upper end or seat 40 of bushing 27, as shown, and to be lifted away therefrom by operation of lever 3. Valve 39 is tightly clamped against an abutment 41 of stem 35 by means of a nut 42.

For the purpose of providing leakage of any water standing in the stand pipe above the valve, a port 43 is provided through the wall of casing 3, adapted to be opened when the valve 39 is closed against circulation, and to be closed when said valve is opened. For such purpose, I use substantially the same means disclosed in the prior patent of Moore referred to, consisting of an annular valve member 44 mounted in a sliding holder 45 and secured by a nut terminal 46 to the threaded portion of stem 35, with proper clearance or circulation openings 46.

As thus constructed, the operation of the device will be readily understood and appreciated.

In normal operation, the lifting of valve 39 above its seat will establish upward flow through the hydrant, such flow continuing as long as the lever 3 is held raised. Upon release, spring 26 will immediately withdraw stem 12 by the outside yoke connection, and promptly re-seat the valve, so that there need be no unnecessary waste of water by inadvertently leaving the hydrant open.

When it is desired to remove the main valve or any of the interior removable portions for repair, the lower valve 30 may be seated upwardly against seat 29 by rotation, whereupon the handle may be removed, together with the outer yoke elements and head 10, allowing for withdrawal of the entire stem portion with the main valve 39. In this respect, the present construction is novel and useful in preventing any upward flow of water during such operation.

The hydrant, as a whole, is comparatively simple and inexpensive, composed of few parts, and provides for easy operation without waste, and for the various contingencies as to weather and other conditions usually affecting such devices.

It may be made in any desired length as to the stand pipe, or dimensions and capacity, or may be variously changed in detail construction by the skilled mechanic, but all such changes are to be considered as within the scope of the following claims.

I claim as my invention:

1. The combination with a hydrant having a central valve stem and an operating lever therefor, of a cross yoke for depressing the stem and lever having tension rods extending down at each side of the hydrant, a ring surrounding the hydrant and connected with the tension rods, and a spring between the ring and an abutment on the hydrant.

2. A hydrant having a reciprocable valve therein and a rotatable valve therein below the reciprocable one, a member having upper and lower seating surfaces thereon for the respective valves, a common operating stem for both valves, spring actuated means for maintaining the reciprocable valve closed, operating means for lifting the stem to open the reciprocable valve, the upper end of the stem being accessible to permit rotation thereof.

3. A hyrdant having a reciprocable valve member therein, a threaded valve member therein, the former being movable downwardly to closing position and the latter being movable upwardly to closing position, a common valve stem connected with each and through which either may be operated independently of the other, resilient means for urging the valve stem down to hold the reciprocable valve closed, and operating means for the valve stem.

4. In a hydrant, a casting provided with a transverse bearing and an upper exhaust port, a bushing mounted in said bearing having an upper and a lower valve seat and an extended threaded and apertured ring, a supplemental valve threaded within said ring having a central splined opening, and a vertically movable and rotatable valve stem having a valve for the upper valve seat, a valve for the exhaust port fixedly connected with said stem for vertical movement therewith, and a stem extension in engagement with the splined opening of the supplemental valve.

5. In a hydrant, a casing provided with a transverse valve seat and a supplemental valve seat having a threaded bushing associated therewith, a supplemental valve threaded in said bushing and movable upwardly to seating position, a valve stem having a main valve thereon above the supplemental valve and a stem extension in a sliding non-rotatable engagement with the supplemental valve, and a spring retracted lever for reciprocating the valve stem.

6. In a hydrant, a casing provided with a transverse valve seat and a supplemental valve seat having a threaded bushing associated therewith, a supplemental valve threaded in said bushing and movable upwardly to seating position, a valve stem having a main valve thereon above the supplemental valve and movable downwardly to seating position and a stem extension in sliding non-rotatable engagement with the supplemental valve, an upper closing cap above the casing, a valve stem extension extending therethrough and provided with a turning abutment, a lifting lever engaging said abutment, and spring retracting mechanism for depressing the valve stem and lever.

7. In a hydrant, the combination of a lower casing having a supply conduit, a main controlling valve and a supplemental shut-off valve, an upper closed head having an outlet conduit, a connecting casing, a sectional valve actuating member having a lower stem engaging the main and supplemental valves respectively, and an upper stem extending through the head and provided with a turning abutment, a pivoted operating lever engaging the upper stem abutment, a cross yoke engaging the upper stem, a ring embracing the casing, a spring between said ring and the upper head, and means connecting the yoke with said ring.

In testimony whereof I affix my signature.

THOR GANNESTAD.